F. A. PERRY.
Spark Arrester.

No. 9,545. Reissued Jan. 25, 1881.

*Witnesses.*
S. N. Piper
E. P. Smith

*Inventor.*
Francis A. Perry.
by attorney
R. H. Eddy

N. PETERS, PHOTO-LITHOGRAPHER, WASHINGTON, D. C.

UNITED STATES PATENT OFFICE.

FRANCIS A. PERRY, OF KEENE, NEW HAMPSHIRE.

SPARK-ARRESTER.

SPECIFICATION forming part of Reissued Letters Patent No. 9,545, dated January 25, 1881.

Original No. 153,907, dated August 11, 1874; Reissue No. 9,364, dated August 31, 1880; Reissue No. 9,421, dated October 19, 1880.
Application for reissue filed November 12, 1880.

*To all whom it may concern:*

Be it known that I, FRANCIS A. PERRY, of Keene, in the county of Cheshire and State of New Hampshire, have invented certain new and useful Improvements in Spark Arresters and Consumers; and I do hereby declare the same to be described in the following specification, and represented in the accompanying drawings, of which—

Figure 1:
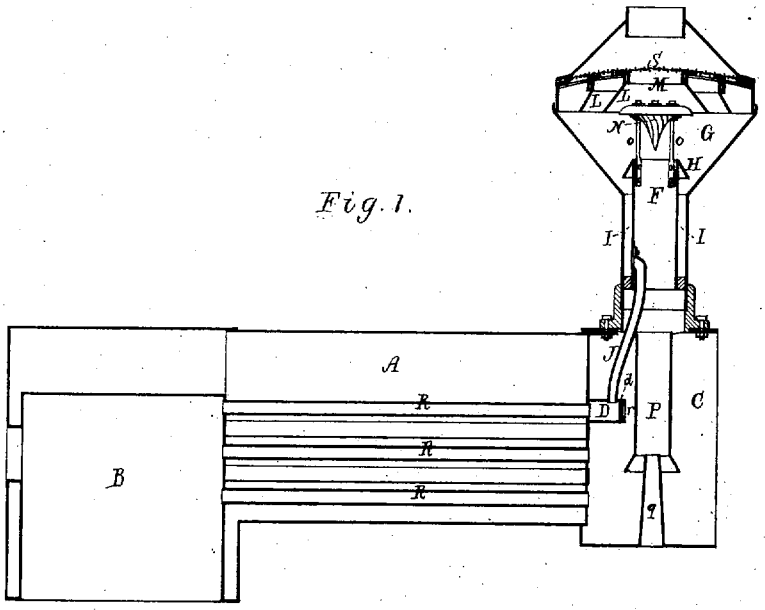
Figure 2:
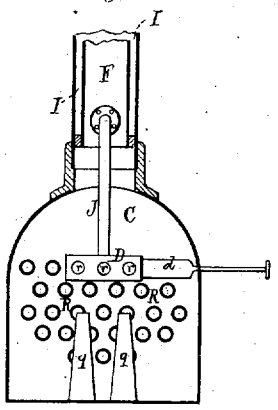

Figure 1 denotes a sectional elevation of a locomotive steam-engine boiler and smoke-stack provided with my invention. Fig. 2 is a sectional view taken through the smoke-chamber, the petticoat-pipe being supposed to be removed for better illustration of the parts in rear of it.

My invention relates to spark arresters and consumers of locomotive as well as stationary boilers. In carrying it out there are combined with the stack and smoke chamber or box of the locomotive or other boiler certain devices, as hereinafter described, for arresting the escape of sparks or other unconsumed or combustible matters, and returning such to the furnace through one or more of the flues leading therefrom through the water-space of the boiler to the smoke chamber or box. These devices are a box arranged in the smoke chamber or arch, and communicating with or opening into one or more of the said flues, and provided on its front with an educt and a sliding door or shutter thereto; also, a pipe leading from said box to and opening into an annular chamber surrounding the chimney, the said annular chamber opening out of the hood, which is above the top of the chimney. Furthermore, there are within the said hood a wire-netting and a conical or tapering deflector, all being essentially as hereinafter set forth.

In Figs. 1 and 2 of the drawings, A represents the water and steam chamber of a locomotive-boiler, B its furnace, C its smoke arch or box, and R R the series of flues or tubes extending through the water-space, and from the furnace to the smoke-chamber, such flues being to lead the smoke and volatile products of combustion away from the furnace and into the smoke-box, from whence they escape by the stack or chimney F, extending up from the top of the said box. The chimney opens into a hood, G, in the upper part of which is a frame, M, for supporting a wire-netting, S, and certain conical deflectors L L, arranged as shown. A series of standards, *o*, extending upward from the chimney F, support immediately over it an inverted conical deflector, N, whose apex is in the prolongation of the axis of the chimney, the outer surface of the said conical deflector being represented as spirally fluted.

The exhaust-steam pipes are shown at *q*, and their petticoat-pipe at P, such exhaust-pipes serving to convey into the petticoat-pipe the waste steam discharged from the cylinder or cylinders of the engine. An oblong box or chest, D, is arranged in the smoke-box C, so as to open into one or more of the flues R—preferably into one or more of the upper ones of the series. This box D has an opening or educt, *r*, in its front, which is provided with a closing door or slide, *d*, and there leads out of the top of the box to the annular chamber I an induction-pipe, J. On drawing the slide, so as to uncover the opening *r* in the front of the box D, the smoke from the furnace, passing through the pipe or flues opening into the box D, will escape directly into the smoke-box C; but on closing the slide the passage of smoke from the box into the smoke-chamber or arch will be cut off or stopped. The smoke and sparks or cinders received into the smoke-chamber C will pass therefrom upward into and through the chimney F, and will strike against the deflectors and netting within the hood, and by such will be deflected, whereby much of the combustible products will be thrown downward into the annular chamber I, and, by the action of the exhaust-steam, will be driven from said chamber into and through the pipe J and box D, and from thence into the furnace by and through the tube or tubes R, leading therefrom into the box D. The combustible products thus driven into the furnace, coming in contact with the fire thereof, will be more or less burned thereby, so as to aid in heating the water for the production of steam in the boiler. The return products of combustion, by passing from the box D into and through one or more flues leading through the water-chamber of the boiler to the furnace, aid in heating the water of such chamber in consequence of more or less of their heat being absorbed by the flue or flues. The conic deflector N, being spirally fluted from its apex upward, will, on the smoke and sparks rushing in contact with it, produce a whirling motion of them and deflect them into the spark-receiving chamber I.

The results of my invention are the generation of steam with a less consumption of fuel, comparatively speaking. By the consumption of the sparks there is less deposit on the locomotive, tending to soil it, and the danger of setting fire to woods or matters in the vicinity of the railway-track is materially diminished.

Surrounding the top of the chimney is a tapering or conical flange, H, the purpose of which is to prevent sparks or cinders from being extracted from the chamber I by the rising currents of air or steam.

The box D opens into the upper row of flues; but I do not confine myself to that special arrangement of it, as it may be applied to one or more of the other flues; but I prefer to have it open into the upper flue or flues, as in that case the box D and pipe J will be better heated, and thereby superheat the steam and the products of combustion to better advantage, and thereby enable them to be better burned by the fire in the furnace.

I am aware that sparks, smoke, and gas received into the smoke-stack of a boiler have been conveyed to the furnace of such boiler by pipes and blast apparatus arranged outside of the boiler and its smoke-stack or chimney, and that flues or pipes have been led from a spark-chamber around the chimney down into the smoke-chamber, and thence to a chamber or box at the bottom thereof, such devices not operating as does my invention.

What I claim as new, and desire to secure by Letters Patent, is as follows:

1. The combination of the box D, provided with the induct J and an educt, *r*, and a valve or slide, *d*, thereto, with the chimney F and and its surrounding annular chamber I and smoke-chamber C, the furnace B, and the flues R, leading from such furnace to the smoke-chamber, the said box being applied to and communicating with one or more of such flues, and to operate substantially as set forth.

2. The combination of the smoke-stack, provided with the chamber I, for receiving deflected sparks and cinders, with the smoke-discharge tubes of the furnace, and with a conduit, provided with an opening to lead into the smoke-box, and also with a slide or valve to such opening, such conduit leading from one or more of the flues into the spark-chamber I, as set forth.

3. The combination, with one or more return-flues leading from the smoke-chamber into the furnace, of a chamber or box, D, and a pipe, J, leading therefrom to a spark receiving chamber of the smoke-stack, as set forth.

4. The method, substantially as described, of controlling and utilizing as fuel the waste sparks and volatile products of combustion, such consisting in discharging or leading them from a chamber of the smoke-stack, by means of a conduit, into a receiver or chamber having an opening into the smoke-box in each, and a valve to each, and thence through one or more pipes or flues leading through the water-space of the boiler and communicating with the furnace, their passage to and from the furnace by the return-pipe or pipes being controlled by means of the opening and valve thereof of the said receiver, and such sparks and products of combustion being forced, by one or more deflectors, in or over the smoke-stack into the receiving-chamber, and thence into and through the receiver and into and through the return pipe or pipes to and into the furnace.

5. The combination of the chimney F, conical deflector N, pipe J, and box D, provided with the opening *r* and slide *d*, with the smoke-box and furnace and their connecting pipe or flues, the said box D being applied to one or more of the said pipes or flues, so as to operate therewith substantially as set forth.

6. The combination of the chimney F, hood G, deflectors N and H, annular chamber I, pipe J, receiver or box D and its slide *d*, with the furnace B and smoke-box C, and their connecting pipes or flues R, such chamber or box D being applied to one or more of such flues to operate therewith as set forth.

7. The spark-box D, arranged within the smoke-chamber C, and to communicate with one or more of the flues leading from the furnace through the water-space A of the boiler to such smoke-chamber, as set forth.

8. The combination of the water and steam chamber A, furnace B, smoke-box C, connecting-flues R, box D, slide *d*, spark-pipe J, petticoat-pipe P, stack or chimney F, spark-receiver I, hood G, curved deflector N, and netting S, all arranged substantially as set forth.

9. The combination of the box or chamber D with one or more of the flues leading from the furnace to the smoke-chamber, one or more exhaust-pipes, *q*, conduit J, chimney F, annular chamber I, and the conic deflector N, or means of intercepting the sparks and deflecting them into the chamber I.

FRANCIS A. PERRY.

Witnesses:
JONAS C. RICE,
SILAS HARDY.